United States Patent
Kinouchi

(10) Patent No.: US 8,082,522 B2
(45) Date of Patent: Dec. 20, 2011

(54) ELECTRONIC APPARATUS

(75) Inventor: Takashi Kinouchi, Tokyo (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 11/435,807

(22) Filed: May 18, 2006

(65) Prior Publication Data

US 2006/0274053 A1 Dec. 7, 2006

(30) Foreign Application Priority Data

May 19, 2005 (JP) ................................ 2005-146819

(51) Int. Cl.
*G06F 3/048* (2006.01)

(52) U.S. Cl. ........ 715/830; 715/784; 715/785; 715/786; 715/787; 715/864

(58) Field of Classification Search ................. 715/830, 715/784–787, 828–829, 864
See application file for complete search history.

(56) References Cited

U.S. PATENT DOCUMENTS

| | | | | |
|---|---|---|---|---|
| 5,483,454 | A * | 1/1996 | Lewiner et al. ............... | 701/200 |
| 5,748,185 | A * | 5/1998 | Stephan et al. ............... | 345/173 |
| 6,239,803 | B1 * | 5/2001 | Driskell ......................... | 715/810 |
| 6,734,883 | B1 * | 5/2004 | Wynn et al. .................... | 715/830 |
| 7,046,230 | B2 * | 5/2006 | Zadesky et al. ............... | 345/156 |
| 7,195,174 | B2 * | 3/2007 | Kogawa ......................... | 235/492 |
| 7,319,457 | B2 * | 1/2008 | Lin et al. ........................ | 345/173 |
| 2002/0030667 | A1 * | 3/2002 | Hinckley et al. ............. | 345/173 |
| 2003/0122787 | A1 * | 7/2003 | Zimmerman et al. ........ | 345/173 |
| 2003/0206202 | A1 * | 11/2003 | Moriya ........................... | 345/846 |
| 2003/0227406 | A1 * | 12/2003 | Armstrong .................... | 341/176 |
| 2004/0207647 | A1 * | 10/2004 | Lundin et al. ................. | 345/672 |
| 2004/0242269 | A1 * | 12/2004 | Fadell .......................... | 455/556.2 |
| 2005/0012723 | A1 * | 1/2005 | Pallakoff ....................... | 345/173 |
| 2005/0134576 | A1 * | 6/2005 | Lin et al. ....................... | 345/173 |

(Continued)

FOREIGN PATENT DOCUMENTS

JP 2001-76415 3/2001

(Continued)

OTHER PUBLICATIONS

Japanese Office Action mailed Sep. 1, 2009 in counterpart Japanese Application No. 2005-146819. (4 pages including 2 pages of Japanese Office Action and 2 pages for a translation of the Japanese Office Action).

(Continued)

*Primary Examiner* — Weilun Lo
*Assistant Examiner* — Rashedul Hassan
(74) *Attorney, Agent, or Firm* — Finnegan, Henderson, Farabow, Garrett & Dunner, LLP

(57) ABSTRACT

An electronic apparatus capable of a suppress area for user interface parts and improving operability, including a touch sensor for detecting contact by an object on a predetermined detection area and operation buttons for detecting press imposed at predetermined positions on the detection area; wherein a screen of a display part continuously scrolls in accordance with movement of a contact position detected by the touch sensor and the screen is scrolled only by a predetermined width every time press on the operation buttons is detected, and it is sufficient to run a finger on the detection area of the touch sensor for scrolling continuously and no button operation is necessary, and when scrolling while selecting items in order by buttons, the operation buttons are provided in the detection area of the touch sensor, so that it is not required many finger movement.

15 Claims, 8 Drawing Sheets

U.S. PATENT DOCUMENTS

2006/0026521 A1* 2/2006 Hotelling et al. ............. 715/702
2006/0229557 A1* 10/2006 Fathallah et al. ............. 604/131
2008/0098330 A1* 4/2008 Tsuk et al. .................... 715/830

FOREIGN PATENT DOCUMENTS

JP          2002-023928       1/2002
JP          2003-296014      10/2003

OTHER PUBLICATIONS

A mobile music player, quick move to HDD era! iPod mini vs HDD Walkman, Toshimi Yotsumoto et al, Nikkei BP, Sep. 8, 2004, vol. 11 No. 9, p. 54. (1 page).

* cited by examiner

HIGH-SPEED SCROLL

SCROLL BY ONE ITEM

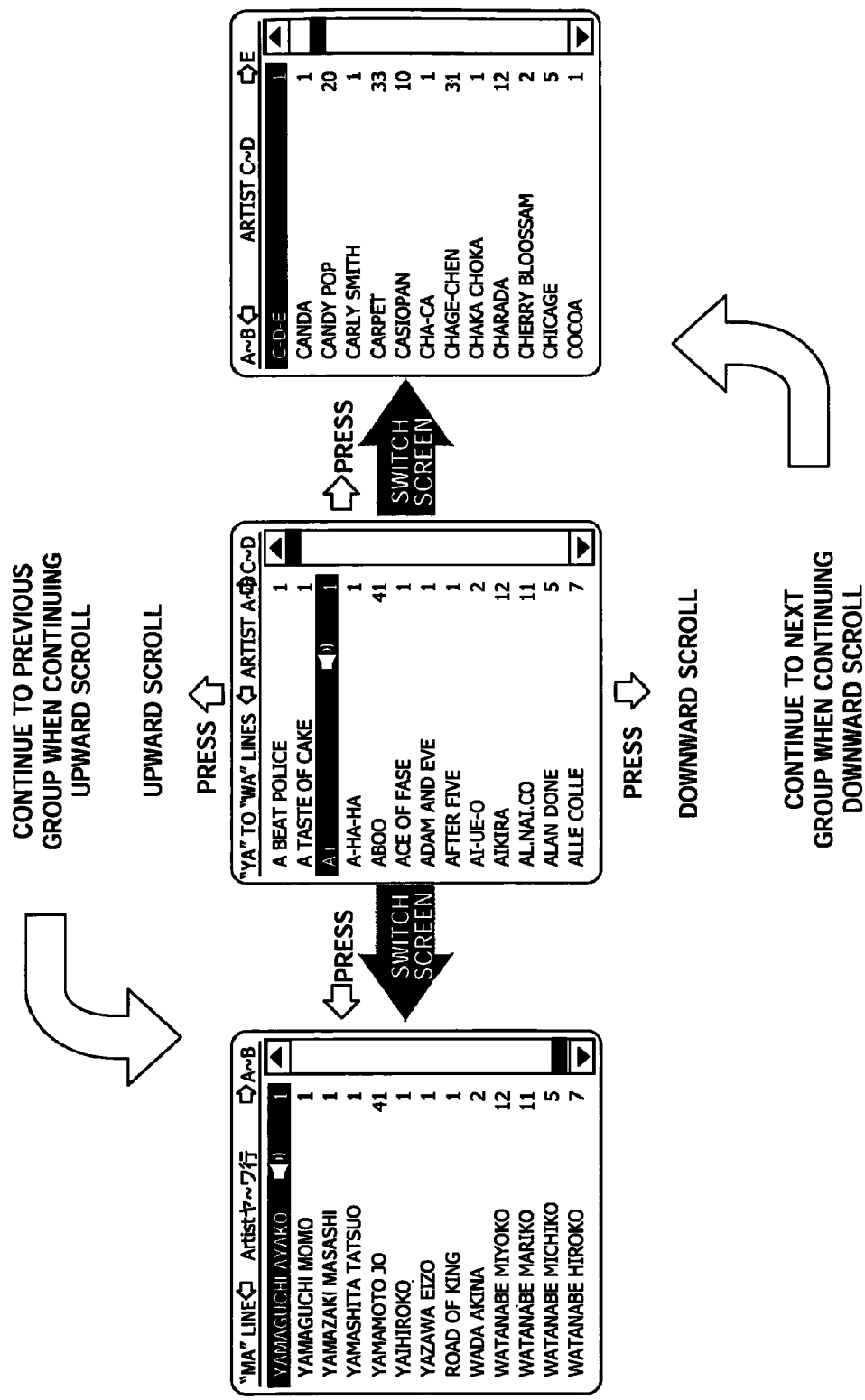

FIG. 7

Middle screen (current):

| All ⇦ | COME AWAY FOR | ⇧ Feels |
|---|---|---|
| 01: | DON'T KNOW ME | 3:06 |
| 02: | SEVEN CHILDREN | 2:25 |
| 03: | COLD WATER | 3:38 |
| 04: | FEELIN' THE SUN SHINE | 2:57 |
| 05: | COME AWAY FOR | 3:17 |
| 06: | SHOOT THE WOLF | 3:56 |
| 07: | TURN ON | 2:34 |
| 08: | LONESOME STAR | 3:06 |
| 09: | I'VE GOT THE MONEY | 4:13 |

:COLD WATER
:NORA
:COME AWAY FOR ★:10
00123 / 45678  3:45 / 5:50  [Info]

Upward scroll — PRESS ⇧ TO NEXT ALBUM → SWITCH SCREEN:

| Come ⇦ | FEELS LIKE SEA | ⇧ First |
|---|---|---|
| 01: | SURPRISE | 3:30 |
| 02: | WHAT IS THIS? | 3:21 |
| 03: | THOSE SWEET CAKES | 3:23 |
| 04: | CARNIVAL AND FESTIVAL | 3:12 |
| 05: | IN THE MOON | 4:07 |
| 06: | BE HERE TO WORK | 3:29 |
| 07: | CREEP | 3:04 |
| 08: | TO ME | 3:46 |
| 09: | HUMBLE YOU | 4:37 |

CONTINUE TO PREVIOUS ALBUM WHEN CONTINUING UPWARD SCROLL

Downward scroll — PRESS ⇩ TO PREVIOUS ALBUM → SWITCH SCREEN:

| First ⇦ | ALL ALBUMS | ⇧ Come |
|---|---|---|
| ALL TRACKS | | 143:44 |
| FIRST WEEK | | 19:17 |
| 01: DON'T KNOW ME | | 3:11 |
| 02: COME AWAY FOR | | 3:06 |
| 03: SOMETHING I SEEKING | | 3:25 |
| 04: TURN ON | | 2:37 |
| 05: LONESOME STAR | | 3:07 |
| 06: PEACE AND LOVE | | 3:51 |
| Come Away for | | 62:51 |
| 01: DON'T KNOW ME | | 3:06 |
| 02: SEVEN CHILDREN | | 2:25 |
| 03: COLD WATER | | 3:38 |
| 04: FEELIN' THE SUN SHINE | | 2:57 |

CONTINUE TO NEXT ALBUM WHEN CONTINUING DOWNWARD SCROLL

ELECTRONIC APPARATUS

CROSS REFERENCES TO RELATED APPLICATIONS

The present invention contains subject matter related to Japanese Patent Application No. 2005-146819 filed in the Japanese Patent Office on May 19, 2005, the entire contents of which being incorporated herein by reference.

BACKGROUND OF THE INVENTION

1. Field of the Invention

The present invention relates to an electronic apparatus provided with a user interface and particularly relates to a portable electronic apparatus provided with a touch sensor.

2. Description of the Related Art

In recent years, as disclosed in Japanese Unexamined Patent Publication No. 2001-76415, for example, technological innovation has been rapidly progressed in the field of portable electronics, such as a cellular phone, portable audio player and portable game player, and an improvement of the multifunction and performance has been furthermore developed. For example, as a result of recording media becoming larger in capacity and development of compression techniques of music, moving picture and still images, it has become possible to store enormous amount of music data in portable audio players.

On the other side of the improvement of the multifunction and performance, information required to be input from a user interface inevitably increases, as well. Particularly in a portable electronic apparatus, however, an area for arranging a device for the user interface is limited due to the limitation on size. Also, when too many operation buttons are provided, the user has to remember functions assigned to each button and it suffers from the disadvantage that the operability declines.

Particularly, in recent portable audio players, a desired music data has to be searched among enormous music data, so that it has become almost difficult to manage by a method of selecting music data one by one by a button operation.

SUMMARY OF THE INVENTION

It is desired to provide an electronic apparatus with improved operability while suppress an area for a user interface device.

According to an embodiment of the present invention, there is provided an electronic apparatus including: a contact detection part detecting contact to a predetermined detection area, a press detection part detecting press imposed on predetermined positions on the detection area; and a processing part continuously performing predetermined processing based on information indicating movement of a contact position detected by the contact detection part and discontinuously performing the predetermined processing based on information indicating press detected by the press detection part.

The electronic apparatus may include a display; wherein the processing part may continuously scroll data displayed on the display based on information indicating movement of a contact position detected by the contact detection part and scroll only by a predetermined width the data displayed on the display every time press is detected by the press detection part.

The electronic apparatus may include movement direction determination part determining a movement direction of a contact position detected by the contact detection part; wherein the press detection part detects press at a first position and a second position on the detection area; and the processing part may continuously scroll the data displayed on the display in the first direction when the movement direction determination part determines that the contact position changes in the direction from the second position to the first position, continuously scroll the data displayed on the display in the opposite second direction from the first direction when the movement direction determination part determines that the contact position movement from the first position to the second position, scroll the data displayed on the display in the first direction only by a predetermined width when press on the first position is detected by the press detection part, and scroll the data displayed on the display in the second direction only by the predetermined width when press on the second position is detected by the press detection part.

The electronic apparatus may include a movement distance acquiring part acquiring a movement distance of a contact position detected by the contact detection part; wherein the processing part may continuously scroll the data displayed on the display at a speed in accordance with a movement distance acquired by the movement distance acquiring part.

The movement distance acquiring part may acquire as the movement distance a distance between an initial contact position when shifting from a state where the contact detection part dose not detect any contact to a state where contact is detected and a contact position after shifting.

The processing part may stop scrolling when contact becomes undetectable by the contact detection part when scrolling the data displayed on the display stop scrolling when contact is detected again after the contact becomes undetectable once by the contact detection unit when scrolling the data displayed on the display, or stop scrolling when movement of the contact position detected by the contact detection part stops.

The processing unit may continuously scroll the data displayed on the display when the press detection unit detects predetermined number of press in predetermined time.

The press detection part may detects press at a first position and a second position in the detection area and a third position and a fourth position inside or outside of the detection area the processing part may display a part of a list of a plurality of items divided into a plurality of item groups on the display, move a display range for each item in order from a lower part to an upper part of the list when press is detected at the first position by the press detection part, move a display range for each item in order from an upper part to a lower part of the list when press is detected at the second position by the press detection part, moves a display range to an item group at an upper part of the list than an item group currently displayed on the screen when press is detected at the third position by the press detection part, and move a display range to an item group at a lower part of the list than an item group currently displayed on the screen when press is detected at the fourth position by the press detection part.

The electronic apparatus may include a memory part for storing the plurality of the data, wherein the processing part may display on the display as a list of the plurality of items made to be associated respectively with the plurality of the data stored in the memory part, continuously scroll the list in accordance with movement of the contact position detected by the contact detection part, scroll the list only by a predetermined number of items every time press is detected at the predetermined position by the press detection part, reads the data corresponding to any one of items currently displayed on the display from the memory part and reproduces the same.

Preferably, when the press detection part may detect press at the predetermined position and the contact position detected by the contact detection part is changed, the processing part may judge that press at the predetermined position is not detected, and perform the processing.

According to another embodiment of the present invention, there is also provided an electronic apparatus including; a contact detection part detecting contact on a predetermined detection area, a movement distance acquiring part acquiring a movement distance of a contact position detected by the contact detection part, and a processing part performing processing based on information indicating a movement distance acquired by the movement distance acquiring part.

Preferably, the movement distance acquiring part may acquire as the movement distance a distance between an initial contact position when shifting from a state where the contact detection part does not detect any contact to a state where contact is detected and a contact position after shifting.

Preferably, the processing part may set a predetermined value relating to an execution condition of predetermined processing to be a value in accordance with the movement distance acquired by the movement distance acquiring part and executes the predetermined processing based on the set value.

The electronic apparatus may include a display wherein the processing part may continuously scroll the display data on the display at a speed in accordance with a movement distance acquired by the movement distance acquiring part.

The processing part may stop scrolling when contact becomes undetectable by the contact detection part when scrolling the data displayed on the display, or stop scrolling when contact is detected again after the contact becomes undetectable once by the contact detection part when scrolling the data displayed on the display.

The electronic apparatus may further include a memory part storing a plurality of the data, wherein the processing part may display on the display as a list a plurality of items made to be associated respectively with a plurality of data stored in the memory part, continuously scroll the list at a speed in accordance with the movement distance acquired by the movement distance acquiring part, reads the data corresponding to any one of items currently displayed on the display and reproduces the same.

BRIEF DESCRIPTION OF DRAWINGS

These and other objects and features of the present embodiment will become clearer from the following description of the preferred embodiments given with reference to the attached drawings, in which:

FIG. 6 is a view of an example of the case where items are divided into initial groups in a list of artists' names;

FIG. 7 is a view of an example wherein items are divided into album groups in a list of music.

DESCRIPTION OF THE PREFERRED EMBODIMENT

Figure 1:
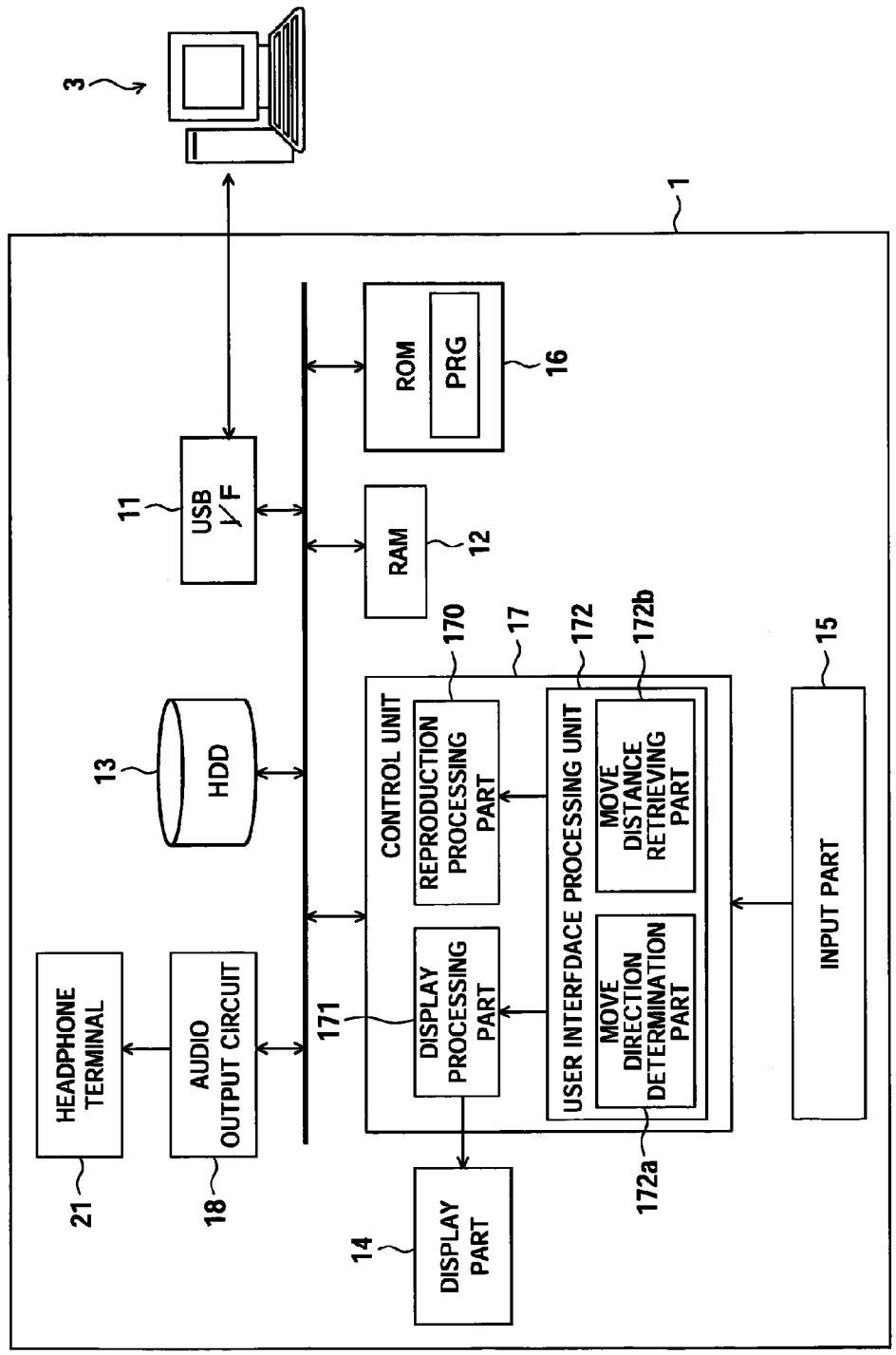
FIG. 1 is a view of a configuration example of an electronic apparatus according to an embodiment of the present embodiment.

FIG. 1 is a view of a configuration example of an electronic apparatus according to an embodiment of the present embodiment, which is an example of an electronic apparatus applied to portable audio players.

The portable audio player 1 shown in FIG. 1 includes a USB (universal serial bus) interface 11, a RAM 12, an HDD (hard disk drive) 13, a display part 14, an input part 15, a ROM 16, a control part 17, an audio output circuit 18 and a headphone terminal 21.

The control part has a reproduction processing part 170, a display processing part 171 and a user interface processing part 172 as a processing block. Furthermore, the user interface processing part 172 includes a movement direction determination part 172a and a movement distance acquiring part 172b.

FIG. 2 is a view of an example of an appearance of a portable audio player shown in FIG. 1.

Figure 2C:
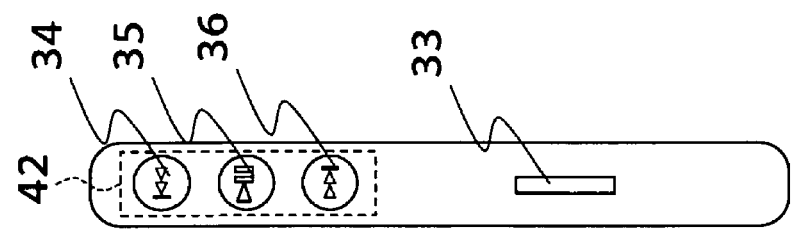
FIG. 2A to FIG. 2C are views of an example of an appearance of a portable audio player shown in FIG. 1.
Figure 2B:
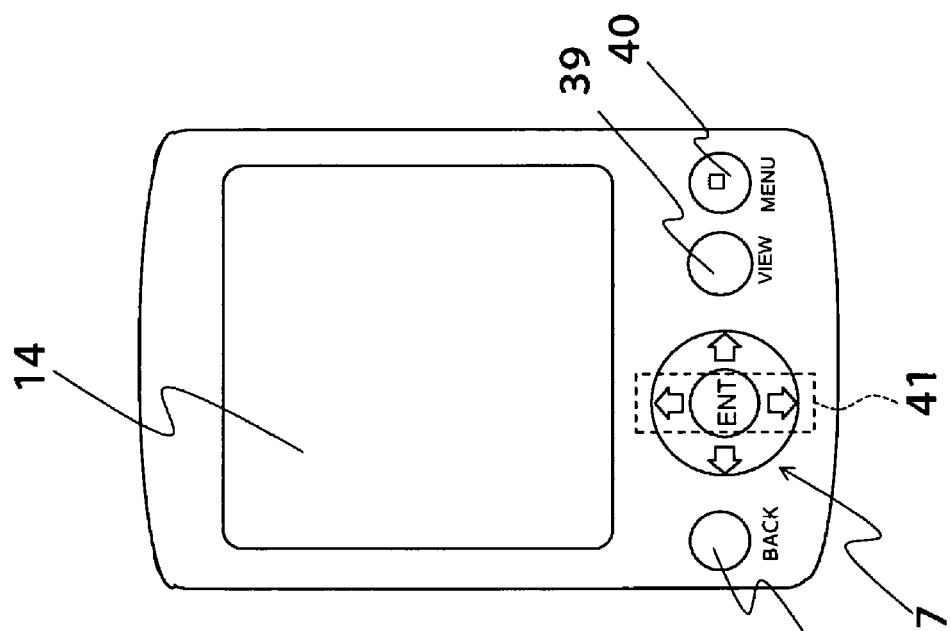

On the front face of the portable audio player 1, a display panel of the display part 14 is provided as shown in FIG. 2B. Below the display panel, a cross-shaped button 37, a back button 38, a view button 39 and a menu button 40 are provided, respectively.

Figure 3A:
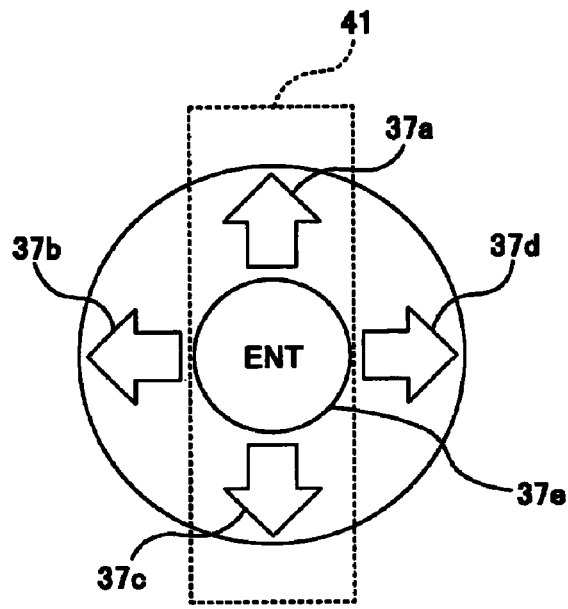
FIG. 3A to FIG. 3C are views for explaining screen scrolling by a touch sensor arranged and overlaid on a cross-shaped button.

The cross-shaped button 37 includes, as shown in FIG. 3A, a determination button 37e, and an upper button 37a, a lower button 37c, a left button 37d and a right button 37d provided above, below and on the left and right of the determination button 37e positioned at the center.

Figure 2A:
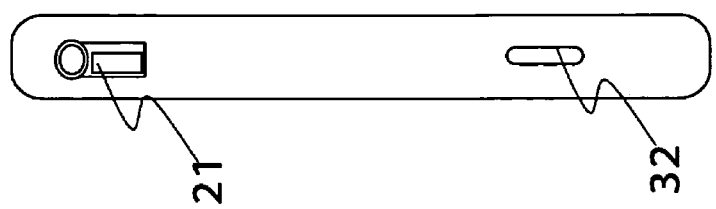

On the left surface of the portable audio player 1, for example as shown in FIG. 2A, the headphone terminal 21 and a hold button 32 are provided.

On the right surface of the portable audio player 1, for example as shown in FIG. 2C, a rewind button, a play/pause button 35, fast-forward button 36, and a volume control dial 33 are provided.

Furthermore, on a vertically long region including press portions of the upper button 37a, determination button 37e and lower button 37c, a touch sensor 41 is provided. A vertically long region including press portions of the rewind button 34, play/pause button 35 and fast-forward button 36, a touch sensor 42 is provided.

The hold button 32, volume control dial 33, rewind button 34, play/pause button 35, fast-forward button 36, cross-shaped button 37, back button 38, view button 39, menu button 40 and touch sensors 41 and 42 are components included in the input part 15 explained above.

Corresponding relations of the respective components of the electronic apparatus (portable audio player) according to the present embodiment and those of the present embodiment are as below.

A unit including the user interface processing part 172 and the input part 15 is an embodiment of the user interface part of the present embodiment.

A unit including the reproduction processing part 170 and the display processing part 171 is an embodiment of the processing part of the present embodiment.

The touch sensors 41 and 42 are embodiments of the touch detection part of the present embodiment, respectively.

The cross-shaped button 37, rewind button 34, play/pause button 35 and the fast-forward button 36 are embodiments of the press detection part of the present embodiment, respectively.

The HDD 13 is an embodiment of the memory part of the present embodiment.

The display part 14 is an embodiment of the display part of the present embodiment.

Below, components explained above will be explained, respectively.

The USB interface 11 is connected, for example, to a personal computer 3 as an external device and exchanges data therewith.

The RAM 12 stores data temporarily used in processing steps of the control part 17 and also stores a program codes PRG loaded from the ROM 16.

For example, the ROM 16 stores a program code PRG regulating a processing procedure of a computer included in the control part 17.

The HDD 13 stores compressed music data (music data).

The music data is written from the personal computer 3 to the HDD 13 via the USB interface 11.

The audio output circuit 18 performs signal processing of digital/analog conversion and amplifying, etc. on the music data decoded in the control part 17 and outputs the result as an audio signal to the headphone terminal 21.

The USB interface 11, RAM 12, HDD 13, ROM 16 and audio output circuit 18 are connected to the control part 17, for example, by a common bus.

The display part 14 is composed of a display part, such as an LCD (liquid crystal display) panel and an organic EL (electroluminescence) display panel, and displays an image (still image and moving picture) in accordance with an image signal supplied from the display processing part 171.

Screen pages to be displayed by the display part 14 are, for example, a menu screen, music selection screen, setting screen and play screen, etc. and switched in response to a user's operation on the input part 15.

The input part 15 is a part for inputting various information to the portable audio player 1.

The hold button 32 is used when invalidating an input from a button or sensor of the input part 15. Due to this, the portable audio player 1 is prevented from operating in the case where the button is pressed unintentionally when not in use.

The volume control dial 33 is used for adjusting a level of an audio signal output from the headphone terminal 21.

The rewind button 34 is used in the case of rewinding a music (returning to the previous music) and the case of lowering a play speed at playing.

The play/pause button 35 is used for controlling start and stop of reproduction of a music.

The fast-forward button 36 is used in the case of fast-forwarding a music (proceeding to the next music) and the case of raising a play speed at playing.

The back (BACK) button 38 is used in the case of moving between hierarchical screens. Namely, the back button 38 is pressed when returning from a lower hierarchy to an upper hierarchy.

The view (VIEW) button 39 and the menu (MENU) button 40 are used when selecting a display mode of the screen or an operation mode.

The cross-shaped button 37 is used for shifting between selection objects of items (music, artists and operation menus, etc.) to be displayed on the screen. When the upper button 37a or a lower button 37c is pressed in the case of displaying a list of items on the screen, the screen is scrolled upward or downward. Also, when the left button 37b or the right button 37d is pressed at this time, the displayed range jumps to the upper part or lower part of the list. When the determination button 37e is pressed, processing corresponding to a selected item (for example, reproducing processing of a selected music) is performed.

The touch sensors 41 and 42 detect physical contact to a predetermined detection area of on the chassis surface of the portable audio player 1. The touch sensors 41 and 42 detect contact based on an electric signal change caused by contact of an object, such as a change of a capacitance and resistance value between electrodes.

The touch sensors 41 and 42 output information on a contact position by the object on a detection area to the user interface processing part 172 of the control part 17.

The control part 17 includes, for example, a computer and controls the whole operations of the portable audio player 1 based on a program code PRG read from the ROM 16.

For example, respective components are integrally controlled in accordance with information input from the input part 15, so that communication with the personal computer 3 at the USB interface 11, management and search of various data (for example, music data and attributes data, such as artist names and album names) in the HDD 13, an output of an audio signal from the audio output circuit 18 and generation of a display screen of the display part 14 are executed appropriately based on procedures of program codes PRG.

The production processing part 170 performs processing of reproducing music in accordance with information to be input from the input part 15 via the user interface processing part 172. For example, when the determination button 37e or the play/pause button 35 is pressed in the case where the display part 14 displays a list of items (music names, artist names and album names, etc.) respectively corresponding to one or a plurality of music data, processing of reading music data corresponding to an item currently selected in the list from the HDD 13, decoding and outputting the same as an audio signal from the audio output circuit 18 is performed. When one item corresponds to a plurality of music (for example, when the item is an album name), for example, the plurality of music may be reproduced successively or a part thereof may be selected for reproduction.

The display processing part 171 generates a display screen of the display part 14 in accordance with information input from the input part 14 via the user interface processing part 172 and supplies an image signal thereof to the display part 14.

The user interface processing part 172 generates data to be used by each processing part (the display processing part 171 and a music reproduction part, etc.) of the control part 17 based on a signal input by an operation by the operation buttons (32, 34, . . . 40), sensors (41 and 42) and dial (32), etc.

The movement direction determination part 172a determines a movement direction of a contact position based on information of the contact position output as detection results from the touch sensors 41 and 42.

Namely, the touch sensor 41 determines whether the contact position movement in the upward direction from the lower button 37c side to the upper button 37a side or in the downward direction inversely.

Also, the touch sensor 42 determines whether the contact position movement in the upward direction from the lower button 37c side to the upper button 37a side or in the downward direction inversely.

The movement distance acquiring part 172b acquires a movement distance of the contact portion based on information of the contact position output as a detection result form the touch sensor 42. For example, the movement distance acquiring part 172b acquires as the above movement distance a distance from an initial contact position, when shifting from a state where contact is not detected by the touch sensor 42 to a state where a contact is detected, to a contact position after the shift.

Here, an explanation will be made on an operation on screen scrolling of the display part 14 in the portable audio player according to the present embodiment having the components explained above.

First, a scroll operation of a screen by the cross-shaped button 37 and the touch sensor 41 will be explained.

As shown in FIG. 3A, the touch sensor 41 detects contact on the vertically long region overlaid on the upper button 37a, determination button 37e and lower button 37c of the cross-shaped button 37.

For example, when the user touches his finger and moves on his/her finger across the region upwardly, the contact is detected by the touch sensor 41 and information on the contact position is supplied to the movement direction determination part 172a. In the movement direction determination part 172a, the upward movement of the contact position is determined based on the supplied positional information. When an upward movement is determined in the movement direction determination part 172a, the display processing part 171 continuously scrolls the screen upwardly in response thereto.

Figure 3B:
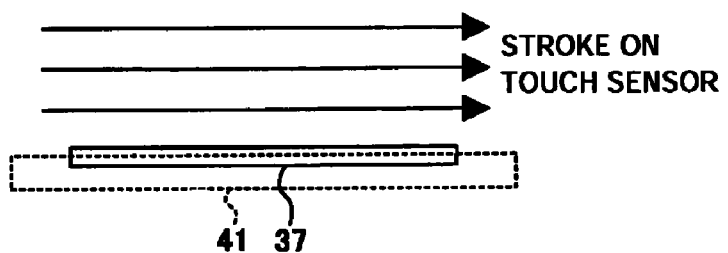

Inversely, when the user touches his finger and moves on the region downwardly the display processing part 171 continuously scrolls the screen of the display part 14 downwardly in response thereto (FIG. 3B).

Note that, "successive scroll" here indicates a state that the screen continuously scrolls.

For example, when movement of the contact position detected by the touch sensor 41 stops, the display processing part 171 stops the continuous scroll. In that case, the screen of the display part 14 scrolls only when the user slides the finger on the detection area of the touch sensor 41.

As another example, when the contact becomes undetectable by the touch sensor 41, the display processing part 171 may stop the scrolling. In that case, when the user takes his/her finger away from the detection area of the touch sensor 41, the scroll of the screen stops. While the finger is in touch, the screen continuously scrolls even when the finger stops sliding.

As still another example, when contact is detected again after the contact once became undetectable by the touch sensor 41, the scroll may be stopped. In that case, the screen continues to scroll even when the user takes the finger away from the detection area of the touch sensor 41. As a result that the user touches the touch sensor 41 again, scrolling of the screen stops.

As explained above, when the touch sensor 41 detects movement of a contact position, the display processing part 171 continuously scrolls a screen of the display part 14.

Figure 3C:
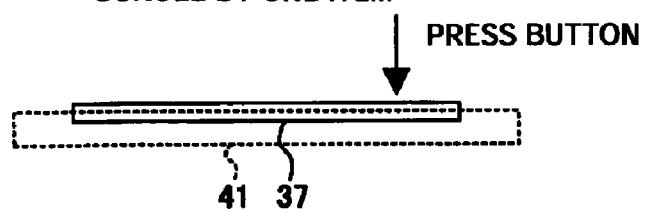

On the other hand, when the upper button 37a or the lower button 37c is pressed without sliding the finger on the touch sensor 41, the display processing part 171 scrolls the screen upward or downward exactly by a predetermined width (for example, by an amount of one item of a list displayed on the screen) (FIG. 3C).

Because the screen is scrolled discontinuously by a predetermined width in response to one press of the button, this scroll will be called "discontinuous scroll" below.

Figure 4:
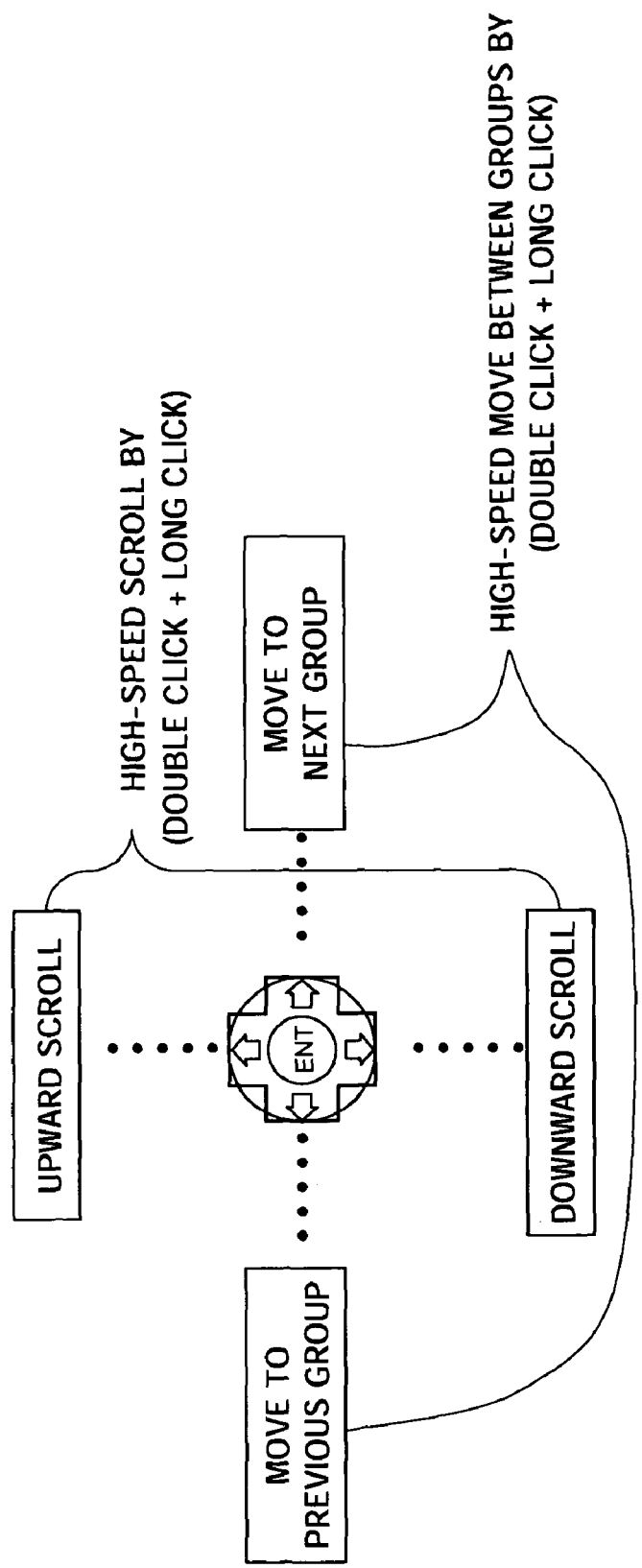
FIG. 4 is a view for explaining screen scrolling by the cross-shaped button.

FIG. 4 is a view for explaining screen scrolling by the cross-shaped button 37.

For example as shown in FIG. 4, the display processing part 171 scrolls the screen upwardly by a predetermined width when the upper button 37a is pressed once and scrolls the screen downwardly by a predetermined width when the lower button 37c is pressed once.

In continuous scroll, scrolling continues without press any button, so that a button has to be pressed for many times to proceed the scroll, but it is suitable to perform a high speed movement between items comparing with discontinuous scroll. On the other hand, a movement amount of items can be determined by the discontinuous scroll, so that the scroll speed is slow but a specific item can be easily selected. Therefore, for example, by moving at a high speed by using continuous scroll and switching to discontinuous scroll when a target comes close in the case where an item as a destination is far, it is possible to reach to the destination even when a large number of items exist and it is possible to prevent to erroneously pass away the destination.

Also, the display processing part 171 continuously scrolls the screen upward or downward when the upper button 37a or the lower button 37c is pressed for predetermined times in predetermined time. For example as shown in FIG. 4, when the upper button 37a is double-clicked and the lower button 37c is kept pressed after that, the display processing part 171 continuously scrolls the screen downwardly.

Namely, it is possible to start continuous scroll by double-clicking of the buttons (37a and 37c) without sliding a finger on the touch sensor 41.

Figure 5:
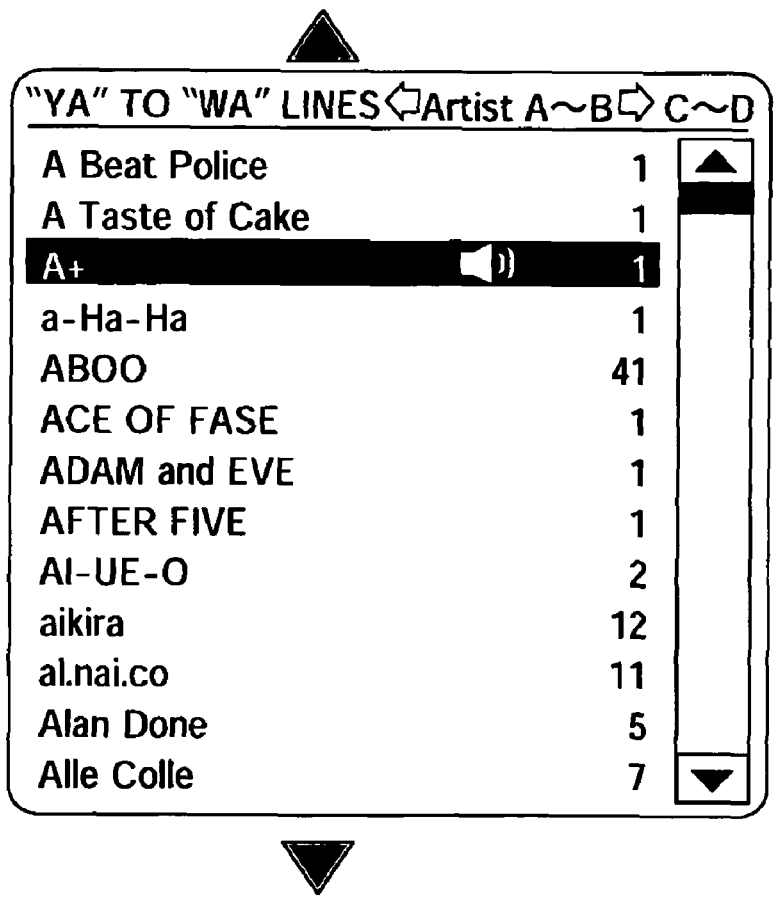
FIG. 5 is a view of an example of a displayed screen of a display part.

FIG. 5 is a view of an example of a displayed screen of a display part 14.

In an example in FIG. 5, a list of a plurality of items (artist names) extends downwardly on the screen.

The display processing part 171 displays a currently selected item discriminately from other items among a plurality of items displayed on the screen. For example, as shown in FIG. 5, black and white of letters are inverted to be displayed to judge from other items.

The display processing part 171 movement items to be selected, for example, to an upper part or lower part of the list when touch sensor 41 detects movement of the contact position or press of the upper button 37a or the lower button is detected. Then, when movement of items to the upper part of the list furthermore continues in a state where an item to be selected reaches the upper most part of the screen, the display processing part 171 scrolls the screen upwardly so that not shown items on the upper part of the list is displayed. Inversely, when movement of items to the lower part of the list furthermore continues in a state where an item to be selected reaches the lower most part of the screen, the screen is scrolled downwardly, so that currently not shown items on the lower part of the list is displayed.

To explain specifically with reference to the example in FIG. 5, when movement on items furthermore continues to an upper part of the list in a state where the uppermost item "A Beat Power" on the screen is selected, the display processing part 171 scrolls the screen upwardly and the upper items belonging to the item group of initials of A to B. Then, when reaching to the uppermost item of the item group of initials of A to B, the display processing part 171 scrolls the screen, so that the lowermost item of an item group starting with Japanese letters "ya to wa lines" in Japanese language positioning above the alphabets is displayed.

Note that items positioning at an upper position is explained "being at an upper part" on the screen here, but it is for convenience of the explanation.

Upward and downward scrolls were explained above, but when the left button 37b or the right button 37d of the cross-shaped button 37 is pressed, it is different from movement of a display range in each item as explained above and is movement of a display range in each item group.

FIG. 6 is a view of an example of the case where items are divided into initial groups in a list of artist names.

In the example in FIG. 6, below the group starting with Japanese letters "ya to wa lines", in Japanese language a group having initial letters of "A to B" continues and, furthermore, a group having initial letters of "C to D" continues below that.

Now, when the left button 37b is pressed in a state of displaying the group with initial letters of "A to B", the display processing part 171 moves a display range from the "A to B" group to the "ya to wa lines" group.

Also, when the right button 37d is pressed in a state of displaying the group "A to B", the display range is moved to the lower "C to D" group.

FIG. 7 is a view of an example wherein items are divided into album groups in a list of music names.

In an example in FIG. 7, below a group of an album "All Albums", a group of an album "Come Away With Me" group continues and, furthermore, a group of an album "Feel Like Home" continues below that.

Now, when the left button 37b is pressed in a state of displaying a "Come Away for" group, the display processing part 171 moves a display range to the "All Albums" group positioning at an upper part than the "Come Away for" group.

Also, when the right button 37d is pressed in a state of displaying the "Come Away for" group, the display processing part 171 moves a display range to a "Feels Like Sea" group positioning at a lower part than the "Come Away for" group.

Next, a scroll operation of the screen by the touch sensor 42 will be explained.

A point that the screen of the display part 14 scrolls by sliding a finger on the touch sensor 42 is the same as that in the touch sensor 41 explained above. Namely, the screen continuously scrolls upwardly when stroking the touch sensor 42 upwardly, while the screen continuously scrolls downwardly when stroking the touch sensor 42 downwardly.

A different point in the scroll methods of the two touch sensors is whether a speed adjusting function is provided or not. Namely, when movement of a contact position is detected in the touch sensor 42, the display processing part 171 scrolls a screen of the display part 14 at a speed in accordance with a movement distance acquired by the movement distance acquiring part 172b.

Figure 8:
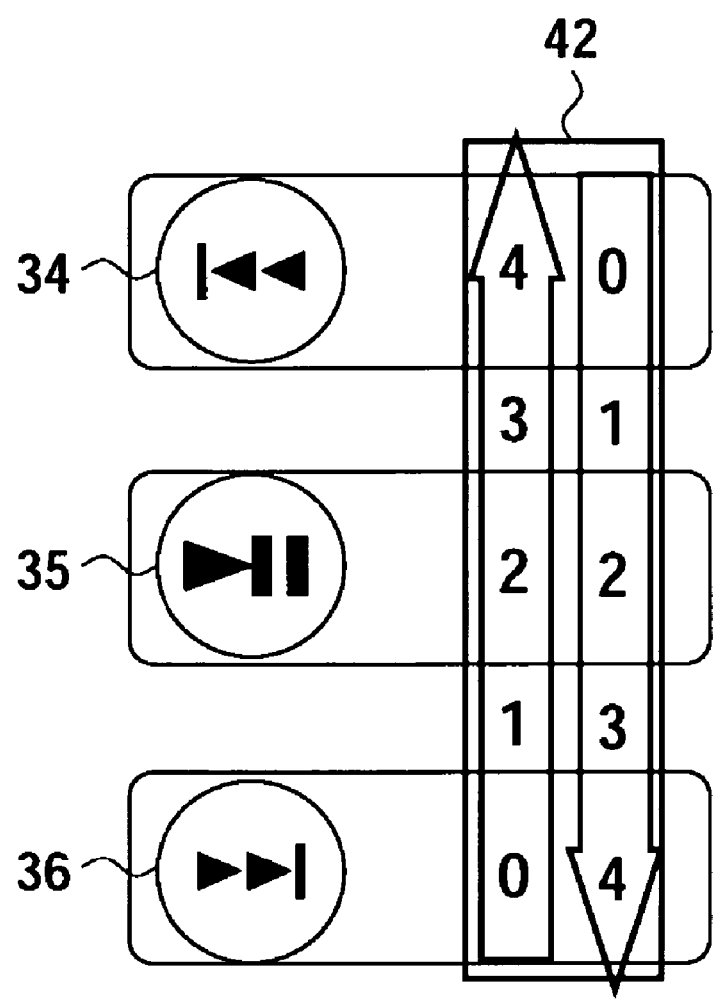
FIG. 8 is a view of an example of relationship of moving distance of and scroll speed.

FIG. 8 is a view of an example of relationship of a moving distance of and a scroll speed.

For example, the movement distance acquiring part 172b outputs a value at 5 levels, "0", "1", "2", "3" and "4" as a movement distance of the contact position on the touch sensor 42. The larger the value is, the longer the movement distance is.

In this case, the display processing part 171 reduces the scroll speed most, for example, when the movement distance acquired by the movement distance acquiring part 172b is "0", and increases the scroll speed in an order of "1", "2", . . . and the speed becomes the fastest when the movement distance is "4".

Note that the display processing part 171 may set an increasing amount (decreasing amount) from the current scrolling speed in accordance with a movement distance acquired by the movement distance acquiring part 172b.

To explained with reference to the example in FIG. 8, for example, every time a finger touches his finger and moves on the touch sensor 42 upwardly exactly by a movement amount of "0", the upward scrolling speed may be raised by one level and, inversely, every time a finger touches his finger and moves on the touch sensor 42 downwardly exactly by a movement amount of "0", the upward scrolling speed may be reduced by one level (that is, the downward scrolling may be raised by one level).

As explained above, according to the portable audio player according to the present embodiment, touch sensors (41 and 42) as contact detection part for detecting contact of an object on a predetermined detection area and operation buttons (34 to 37) as press detection part for detecting pressure imposed on predetermined positions in the detection area are provided. Therefore, an area of the device surface assigned to these parts can be reduced comparing with that in the case of arranging them separately. Also, since the operation buttons are arranged on the detection area of the touch sensors, users can operate them both without moving their fingers much, so that the operability improves.

Also, according to the above portable audio player, a screen of the display part 14 is continuously scrolled in accordance with movement of a contact position detected by the touch sensors (41 and 42). Also, the screen is scrolled exactly by a predetermined width every time an operation button (34 to 37) detects press.

Therefore, it is sufficient to run a finger on the detection area of the touch sensors (41 and 42) to scroll continuously, and it is not necessary to press the operation buttons (34 to 37) for many times. Also, when scrolling by selecting each item in order by a button operation, the operation buttons (34 to 37) are provided on the same detection area used in the case of high-speed scrolling, so that it is not required many finger movement.

Namely, a continuous high-speed scrolling and discontinuous fine scrolling can be performed by a natural operation without moving a finger excessively. Accordingly, it is possible to reach desired music data by a simple operation and the operability increases.

Furthermore, according to the above portable audio player, when the movement direction determination part 172a determines that a contact position on the touch sensor is moving in the direction from the lower button 37c to the upper button 37a, a screen on the display part 14 is continuously scrolled upwardly. When the movement direction determination part 172a determines that the contact position is changing in the direction of the upper button 37a to the lower button 37c, the screen is continuously scrolled downwardly. When press on the upper button 37a is detected, the screen is scrolled upwardly only by a predetermined width. When press on the lower button is detected, the screen is scrolled downwardly only by a predetermined width.

As a result, by moving a contact position on the touch sensor 41 along an arrangement of the two operation buttons (37a and 37c) for scrolling the screen upwardly and downwardly by a predetermined width, the screen can be continuously scrolled upwardly and downwardly. Namely, since an arrangement direction of the two operation buttons (37a and 37c) used for upward and downward scrolling matches with the direction of sliding a finger for upward and downward scrolling, connection between button operations and slide operations can be intuitively known and the operation becomes easier.

By stopping scrolling when movement of the contact position detected by the touch sensors (41 and 42) stops, the screen can be scrolled together with the movement of the contact position.

Also, according to the above portable audio player, a screen of the display part 14 is continuously scrolled when an operation button (37a and 37c) is pressed for a predetermined number of times in predetermined time by double-clicking, etc. As a result, continuous scrolling and discontinuous scrolling can be switched only by an operation on the operation buttons (37*a* and 37*c*), so that the operability furthermore improves.

Also, according to the above portable audio player, when the upper button 37*a* is pressed when a screen of the display part 14 displays a part of a list of a plurality of items (music names and artist names, etc.) divided into a plurality of item groups, the display range is moved in order for each item from the lower part to the upper part of the list; and when the lower button 37*c* is pressed, the display range movement in order for each item from the upper part to the lower part of the list. When the left button 37*b* is pressed, the display range movement to an item group of the upper part of the list than the item group currently displayed on the screen, while when the right button is pressed, the display range movement to an item group of a lower part of the list than the item group currently displayed on the screen.

As explained above, when the upper or lower button (37*a* and 37*c*) is pressed, the screen is scrolled in an order of items of the list; and when the left or right button (37*b* and 37*d*) is pressed, the display range movement to a different item group. As a result, a movement amount of the display range can be switched only by an operation on the upper, lower, left and right buttons (37*a* to 37*d*). Also, by dividing a plurality of items according to predetermined attributes (an order of initials, etc.), a search range is easily narrowed down, so that a searching efficiency can be improved.

Also, according to the above portable audio player, a movement distance of a contact position detected by the touch sensor 42 is acquired by the movement distance acquiring part 172*b*, and a screen of the display part 14 is continuously scrolled at a speed in accordance with the acquired movement distance.

As a result, the scrolling speed can be changed without operating the buttons, etc. provided away from the touch sensor 42, the operability improves. Furthermore, the above operation method of changing the speed by a sliding distance on the touch sensor 42 is, for example, the same as that of the sliding type volume controller, so that the operation amount is easily and intuitively known and speed adjustment becomes very easy.

Also, in the movement distance acquiring part 172*b*, a distance between an initial contact position when shifting from a state where the touch sensor 42 does not detect any contact to a state where a contact is detected and a contact position after shifting is acquired as a movement distance. Therefore, scrolling speed can be adjusted even by sliding a finger at any position on the touch sensor 42, so that speed adjustment becomes remarkably easier comparing with that in the case of adjusting based on a distance from a fixed reference position.

Also, by stopping screen scrolling when contact becomes undetectable by the touch sensor (41 and 42) during screen scrolling, it becomes unnecessary to be bothered to operate a button, etc. provided away from the touch sensors (41 and 42) for stop scrolling, the operation becomes easy. By stopping screen scrolling when contact is detected again after the contact is once undetectable by the touch sensor (41 and 42) during screen scrolling, the operation also becomes easy in the same way as above.

Note that the present embodiment is not limited to the above embodiment and a various modifications are included.

In the above embodiment, examples of controlling screen scrolling in accordance with detection results of the touch sensors (41 and 42) and the operation buttons (34 to 37) are shown, but the present embodiment is not limited to that. For example, reproduction, fast-forwarding, rewinding and volume control of music, etc. may be also controlled in accordance with detection results of the touch sensors (41 and 42) and the operation buttons (34 to 37).

When controlling speed, reproduction, fast-forwarding and rewinding of music may be continuously performed by sliding a finger on the touch sensor (41 and 42) and these processing may be discontinuously performed only for predetermined time (or only while press) by press the operation buttons (34 to 37).

Also, when controlling volume, it is continuously changed by sliding a finger on the touch sensor (41 and 42) and is changed discretely by a predetermined amount by press the operation buttons (34 to 37).

As explained above, in the present embodiment, predetermined processing may be continuously performed in accordance with movement of a contact position detected by the contact detection part (touch sensors 41 and 42) and predetermined processing may be discontinuously performed every time press on predetermined positions is detected by the press detection part (operation buttons 34 to 37).

Furthermore, in the above embodiment, an example of setting a speed of screen scrolling on the display part 14 to be a value according to a movement distance of a contact position detected by the touch sensor 42 is explained, but the present embodiment is not limited to that. For example, speeds of reproduction, fast-forwarding and rewinding of music and volume of music can be also set to values according to the movement distance of the contact position explained above.

Namely, in the present embodiment, predetermined values relating to execution conditions of predetermined processing may be set to values in accordance with a movement distance acquired by the movement distance acquiring part (movement distance acquiring part 172*b*) and the predetermined processing may be executed by using the set values.

When the operation buttons (34, 35, 36, 37*a* and 37*c*) arranged on the detection area of the touch sensors (41 and 42) are pressed, when the contact position detected by the touch sensors (41 and 42) is moved, it is also possible to determine that the operation button is not pressed and the processing of the control part 17 may be executed. As a result, even when an operation button is erroneously pressed when intending to run a finger on the touch sensors (41 and 42), it is possible to prevent unexpected processing.

In the above embodiment, an example of scrolling a screen in accordance with movement on items to be selected was explained, but inversely, the item to be selected may be moved in accordance with the screen scrolling.

For example, when an item to be selected is not shown being below the screen by upward screen scrolling, the lowermost item on the screen is displayed as a currently selected item, while when an item to be selected is not shown being above the screen by downward screen scrolling, the item on the top of the screen may be displayed as a currently selected item.

Also, by fixing an item to be selected at a predetermined position on the screen (for example at the center of the screen), the display processing part 171 may move the item to be selected to an upper part of the list in accordance with upward screen scrolling or move the item to be selected to a lower part of the list in accordance with downward screen scrolling.

In the above embodiment, an example of using buttons as press detection part was explained, but the present embodiment is not limited to that. The press detection part are not limited to mechanical parts and, for example, pressure sensitive switches for changing a resistance value in accordance with pressure or those which detect pressure by electric characteristics may be used. Namely, the press detection part of the present embodiment can be realized by using a variety of sensors capable of detecting pressure imposed on specific positions.

It should be understood by those skilled in the art that various modifications, combinations, sub-combinations and alternations may occur depending on design requirements and other factors insofar as they are within the scope of the appended claims or the equivalents thereof.

What is claimed is:

1. An electronic apparatus, comprising:
    a contact detection part detecting a contact with a detection area and movement of the contact in the detection area, the contact detection part including a vertical region;
    a press detection part detecting a press on the detection area and including a section having a directional key, wherein the vertical region of the contact detection part is overlaid on the section of the press detection part having the directional key;
    a processing part performing a first type of processing based on detection of the movement of the contact in the vertical region and performing a second type of processing based on detection of the press on the directional key, wherein the processing part selectively activates continuous scrolling or discontinuous scrolling based on a type of contact between a user's finger and the detection area;
    an audio playing device coupled with the processing part, wherein the processing part continuously fast-forwards or rewinds audio based on a detection by the contact detection part and discontinuously fast-forwards or rewinds audio based on a detection by the press detection part; and
    a display displaying items and coupled with the processing part,
    wherein the processing part:
        activates the continuous scrolling of the items on the display in response to a detection, by the press detection part, of a predetermined plurality of presses by the user's finger within a predetermined time period;
        executes the continuous scrolling of the items on the display in response to at least one of the detected plurality of presses or a movement of the user's finger, wherein the continuous scrolling continues after the finger stops moving and after the finger is not in contact with the detection area; and
        executes the discontinuous scrolling of the items on the display in response to a detection, by the press detection part, of a single press of the user's finger within the predetermined time period, wherein the discontinuous scrolling discontinues after the finger stops pressing and after the finger is not in contact with the detection area.

2. An electronic apparatus as set forth in claim 1, wherein the processing part activates the continuous scrolling of the items on the display based on a movement of a contact caused by a single stroke or a double-click and discontinuously scrolls items on the display only by a predetermined width every time the single press is detected within the predetermined time period.

3. An electronic apparatus as set forth in claim 2, further comprising a movement direction determination part determining the movement direction of the contact, wherein:
    the press detection part detects presses at a first position and a second position on the detection area, and
    the processing part continuously scrolls items on the display in a first direction or seamlessly fast-forwards audio when the movement direction determination part determines that the contact moves from the second position to the first position, continuously scrolls items on the display in a second direction or continuously rewinds audio when the movement direction determination part determines that the contact moves from the first position to the second position, scrolls items on the display in the first direction only by a predetermined width or fast-forwards audio only by a predetermined amount when a press on the first position is detected, and scrolls items on the display in the second direction only by a predetermined width or rewinds audio only by a predetermined amount when a press on the second position is detected.

4. An electronic apparatus as set forth in claim 2, further comprising a movement distance acquiring part acquiring a movement distance of the contact, wherein the processing part scrolls items on the display or fast-forwards or rewinds audio at a speed in accordance with the movement distance.

5. An electronic apparatus as set forth in claim 2, wherein the processing part continues the continuous scrolling or continues the continuous fast-forwarding or rewinding audio when the contact becomes undetectable, and stops the continuous scrolling or stops the continuous fast-forwarding or rewinding audio when the contact is detected again after becoming undetectable, or stops the discontinuous scrolling or stops the discontinuous fast-forwarding or rewinding audio when the detection of the press stops.

6. An electronic apparatus as set forth in claim 2, wherein the processing part continuously fast-forwards or rewinds audio when the press detection part detects the predetermined number of presses in the predetermined time period.

7. An electronic apparatus as set forth in claim 2, wherein:
    the press detection part detects presses at a first position and a second position in the detection area and a third position and a fourth position inside or outside the detection area; and
    items being divided into a plurality of item groups, the processing part displays a portion of an item group on the display, moves a display range upward, or fast-forwards audio when a press is detected at the first position, moves a display range downward, or rewinds audio when a press is detected at the second position, moves a display range to an antecedent item group when a press is detected at the third position, and moves a display range to a subsequent item group when a press is detected at the fourth position.

8. An electronic apparatus as set forth in claim 2, further comprising a memory part for storing items and audio data, the items being associated with respective audio data, wherein the processing part reads the audio data associated with any one of the items currently displayed on the display from the memory part and reproduces the audio.

9. An electronic apparatus as set forth in claim 1, wherein when the press detection part detects a press on the detection area and the contact detection part detects a movement of the contact, the processing part disregards the press and performs processing.

10. An electronic apparatus comprising:
    a contact detection part detecting a contact with a detection area and movement of the contact in the detection area, the contact detection part including a vertical region;
    a press detection part detecting a press on the detection area and including a section having a directional key, wherein the vertical region of the contact detection part is overlaid on the section of the press detection part having the directional key;
a movement distance acquiring part acquiring a movement distance of the contact;
a processing part performing a first type of processing based on the movement distance and the detection of the movement of the contact in the vertical region and performing a second type of processing based on detection of the press on the directional key, wherein the processing part selectively activates continuous scrolling or discontinuous scrolling based on a type of contact between a user's finger and the detection area;
an audio playing device coupled with the processing part, wherein the processing part fast-forwards or rewinds audio at a speed in accordance with the movement distance; and
a display displaying items and coupled with the processing part,
wherein the processing part:
activates the continuous scrolling of the items on the display in response to a detection, by the press detection part, of a predetermined plurality of presses by the user's finger within a predetermined time period;
executes the continuous scrolling of the items on the display in response to at least one of the detected plurality of presses or a movement of the user's finger, wherein the continuous scrolling continues after the finger stops moving and after the finger is not in contact with the detection area; and
executes the discontinuous scrolling of the items on the display in response to a detection, by the press detection part, of a single press of the user's finger within the predetermined time period, wherein the discontinuous scrolling discontinues after the finger stops pressing and after the finger is not in contact with the detection area.

11. An electronic apparatus as set forth in claim 10, wherein the processing part sets an execution condition value in accordance with the movement distance and executes processing based on the set value.

12. An electronic apparatus as set forth in claim 11, wherein the processing part scrolls items on the display based on the movement of the contact, and the processing part continues the continuous scrolling or continues the fast-forwarding or rewinding when the contact becomes undetectable, and stops the continuous scrolling or stops the fast-forwarding or rewinding audio when the contact is detected again after becoming undetectable.

13. An electronic apparatus as set forth in claim 10, wherein the processing part scrolls items on the display at a speed in accordance with the movement distance.

14. An electronic apparatus as set forth in claim 13, further comprising a memory part storing items and audio data, the items being associated with respective audio data, wherein the processing part reads the audio data associated with any one of the items currently displayed on the display and reproduces the audio.

15. A method for controlling scrolling of items displayed on a display, the method being executed by an electronic apparatus, the method comprising:
detecting a contact with a contact detection part of a detection area of the electronic apparatus and movement of the contact in the detection area, the contact detection part including a vertical region;
detecting a press on a press detection area of the detection area, the press detection area including a section having a directional key, wherein the vertical region of the contact detection part is overlaid on the section of the press detection part having the directional key;
performing a first type of processing based on detection of the movement of the contact in the vertical region;
performing a second type of processing based on detection of the press on the directional key, wherein the processing part continuously fast-forwards or rewinds audio based on a detection of the contact and discontinuously fast-forwards or rewinds audio based on a detection of the press;
selectively activating continuous scrolling or discontinuous scrolling based on a type of contact between a user's finger and the detection area, wherein the activating comprises:
activating the continuous scrolling of the items on the display in response to a detection, by the press detection part, of a predetermined plurality of presses by the user's finger within a predetermined time period;
displaying items on a display device of the electronic apparatus;
executing the continuous scrolling of the items on the display in response to at least one of the detected plurality of presses or a movement of the user's finger, wherein the continuous scrolling continues after the finger stops moving and after the finger is not in contact with the detection area; and
executing the discontinuous scrolling of the items on the display in response to a detection, by the press detection part, of a single press of the user's finger within the predetermined time period, wherein the discontinuous scrolling discontinues after the finger stops pressing and after the finger is not in contact with the detection area.

* * * * *